United States Patent
Desai et al.

(10) Patent No.: US 10,950,131 B1
(45) Date of Patent: Mar. 16, 2021

(54) IMPACT-INDUCED LIGHTING TO MITIGATE POST-ACCIDENT RISK

(71) Applicant: United Services Automobile Association (USAA), San Antonio, TX (US)

(72) Inventors: Snehal Desai, Richardson, TX (US); Andrew L. Anaruk, San Antonio, TX (US); Bradly J. Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/915,428

(22) Filed: Jun. 29, 2020

Related U.S. Application Data

(63) Continuation of application No. 16/555,520, filed on Aug. 29, 2019, now Pat. No. 10,726,726, which is a continuation of application No. 16/225,658, filed on Dec. 19, 2018, now Pat. No. 10,438,490, which is a continuation of application No. 15/397,451, filed on Jan. 3, 2017, now Pat. No. 10,163,349.

(51) Int. Cl.
| | | |
|---|---|---|
| *G08G 1/00* | (2006.01) | |
| *G08G 1/16* | (2006.01) | |
| *H05B 45/20* | (2020.01) | |
| *B60R 16/03* | (2006.01) | |
| *B60Q 9/00* | (2006.01) | |
| *H05B 33/08* | (2020.01) | |

(52) U.S. Cl.
CPC ............ *G08G 1/165* (2013.01); *B60Q 9/00* (2013.01); *B60R 16/0315* (2013.01); *G08G 1/162* (2013.01); *H05B 33/08* (2013.01); *H05B 45/20* (2020.01); *B60Q 2400/10* (2013.01); *B60Q 2900/30* (2013.01)

(58) Field of Classification Search
CPC ........ G08G 1/165; G08G 1/162; H05B 33/08; H05B 33/0872; B60R 16/0315; B60Q 9/00; B60Q 2900/30; B60Q 2400/10
USPC .......................................... 340/902
See application file for complete search history.

(56) References Cited

U.S. PATENT DOCUMENTS

| | | |
|---|---|---|
| 6,323,766 B1 | 11/2001 | Bartlett et al. |
| 10,163,349 B1 | 12/2018 | Desai et al. |
| 10,186,177 B1 * | 1/2019 | Salter ................ F21S 43/16 |
| 2003/0164755 A1 | 9/2003 | Moritz et al. |
| 2004/0057241 A1 | 3/2004 | Lin |
| 2008/0062706 A1 | 3/2008 | Feldmeier |
| 2009/0261964 A1 * | 10/2009 | Trevisi ................ G08B 5/002 |
| | | 340/473 |
| 2013/0170242 A1 | 7/2013 | Power et al. |
| 2015/0228184 A1 | 8/2015 | Buck, Jr. et al. |
| 2015/0360604 A1 | 12/2015 | Cameron et al. |

\* cited by examiner

*Primary Examiner* — Tanmay K Shah
(74) *Attorney, Agent, or Firm* — Fletcher Yoder, P.C.

(57) ABSTRACT

The present disclosure relates generally to safety lighting devices for automotive vehicles. A safety lighting system coupled to an automotive vehicle includes a power source that is independent of an electrical system of the vehicle. The system also includes a lighting feature electrically coupled to the power source, wherein the lighting feature is configured to activate in response to an impact event.

18 Claims, 3 Drawing Sheets

IMPACT-INDUCED LIGHTING TO MITIGATE POST-ACCIDENT RISK

CROSS REFERENCE TO RELATED APPLICATION

This application is a continuation of U.S. patent application Ser. No. 16/555,520, entitled, "IMPACT-INDUCED LIGHTING TO MITIGATE POST-ACCIDENT RISK," filed Aug. 29, 2019, which is a continuation of U.S. Pat. No. 10,438,490, entitled, "IMPACT-INDUCED LIGHTING TO MITIGATE POST-ACCIDENT RISK," filed Dec. 19, 2018, which is a continuation of U.S. Pat. No. 10,163,349, entitled, "IMPACT-INDUCED LIGHTING TO MITIGATE POST-ACCIDENT RISK," filed Jan. 3, 2017, which are hereby incorporated by reference in their entirety for all purposes.

BACKGROUND

The present disclosure relates generally to safety lighting devices for automotive vehicles.

Standard automotive lighting features, such as headlamps, turn signals, and hazard lighting, are commonly positioned along the front and rear corners of the exterior of an automotive vehicle, which are particularly vulnerable to collision damage. Further, these standard lighting features are dependent on the primary electrical system of the vehicle for power. In the event of an automotive accident, it is not uncommon for the standard lighting features of a vehicle to be damaged or electrical system of the vehicle to partially or completely fail. As a result, one or more disabled vehicles may be located in or around an active roadway and not have these standard lighting features available to signal their presence to passing motorists, nearby pedestrians, or emergency response crews. Consequently, a single automotive accident in or around an active roadway commonly triggers additional accidents, resulting in further damage and injury.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In an embodiment, a safety lighting system coupled to an automotive vehicle includes a power source that is independent of an electrical system of the vehicle. The system also includes a lighting feature electrically coupled to the power source, wherein the lighting feature is configured to activate in response to an impact event.

In another embodiment, a method of operating a safety lighting system coupled to an automotive vehicle includes activating a lighting feature of the safety lighting system in response an impact event. The safety lighting system comprises a power source that is electrically coupled to the lighting feature and that is independent of an electrical system of the automotive vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for providing safety lighting for automotive vehicles that automatically activates in response to an impact event. An "automotive vehicle," as used herein, refers to any suitable machine or system used for transporting passengers and/or cargo, including but not limited to: cars, pickup trucks, motorcycles, tractor trailers, recreational vehicles (RVs), all-terrain vehicles (ATVs), water vehicles (e.g., jet skis, boats, yachts), trains, helicopters, planes, and so forth. An "impact event," as used herein, refers to a rapid acceleration experienced by at least a portion of an automotive vehicle, such as due to a collision or road hazard (e.g., pot holes, curbs, roadway debris), that triggers activation of the disclosed safety lighting system. A "rapid acceleration," as used herein, refers to an acceleration of the vehicle, positive or negative (e.g., deceleration), that is greater than a predetermined threshold (e.g., greater than 3 g, greater than 5 g, greater than 10 g on the g-force scale) and that occurs in a brief period of time (e.g., on the order of microseconds or milliseconds). A "lighting feature," as used herein, refers to a light-producing element that is coupled to an interior or exterior portion of an automotive vehicle, which may provide, for example, illumination for passengers, warnings to other motorists, information to first responders. A "first responder" or "emergency responder," as used herein, generally refers to persons that typically respond to provide support in response to an emergency event, including law enforcement, paramedics, fire fighters, emergency medical technicians (EMTs), hazardous materials (HazMat) crews, or members of the national guard, and may also, in certain circumstances, include civilians that volunteer emergency assistance (e.g., "good Samaritans"). Lighting features may include one or more light emitting elements (e.g., light emitting diodes (LEDs), light bulbs, electroluminescent paint) arranged either individually or in combination (e.g., in an array that forms a display) to produce a visually detectable output.

Figure 1:
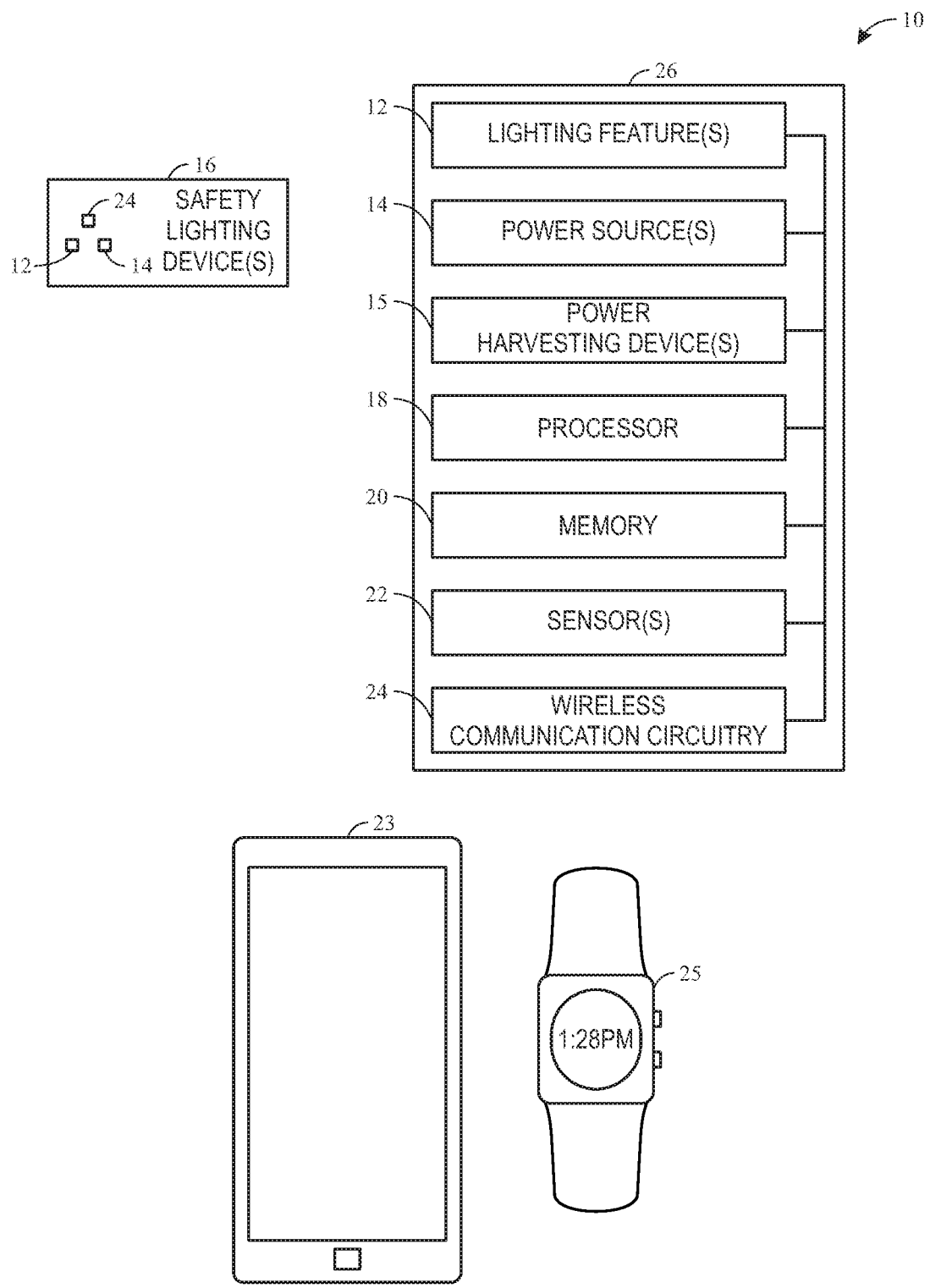
FIG. 1 is a schematic diagram of a safety lighting system, in accordance with embodiments of the present technique.
Figure 2:
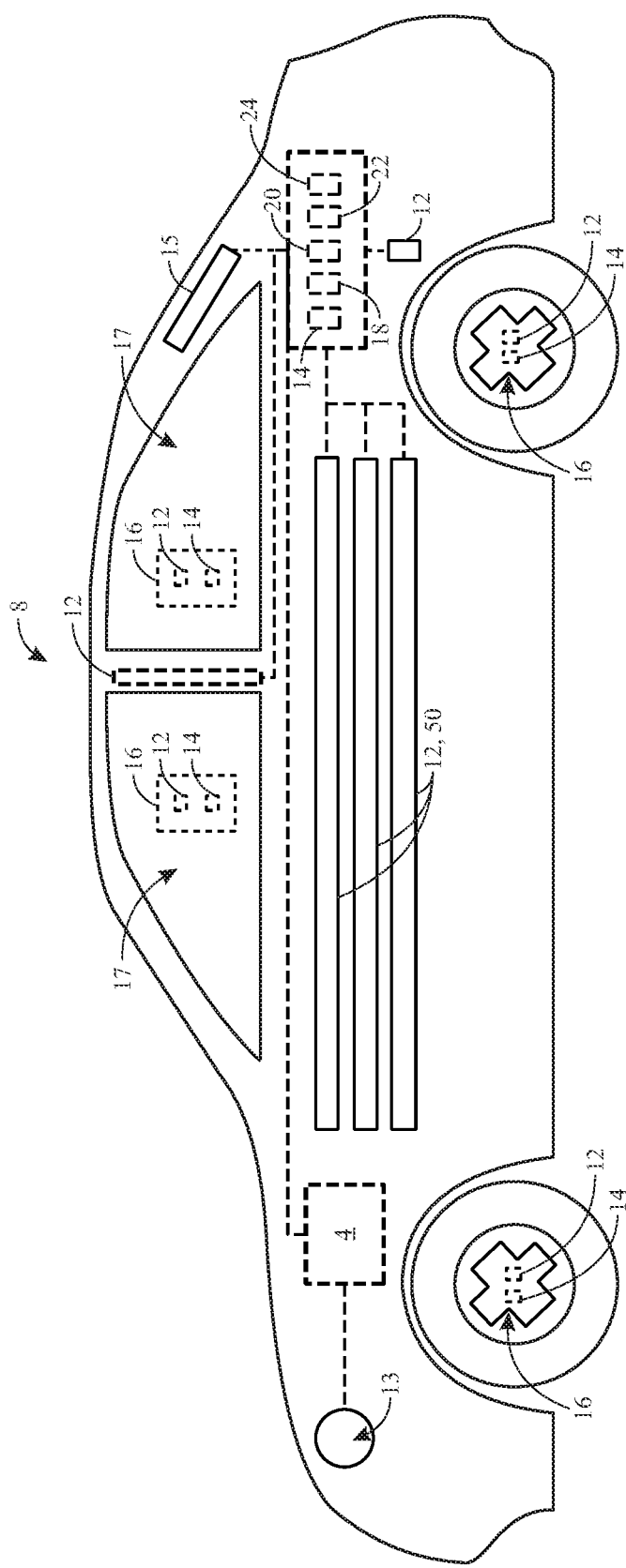
FIG. 2 is a schematic diagram of a safety lighting system installed in an automotive vehicle, in accordance with embodiments of the present technique.

An example of a safety lighting system 10 is schematically illustrated in FIGS. 1 and 2, in accordance with present embodiments. As discussed below, in other embodiments, the safety lighting system 10 may involve a simplified design that includes fewer components (e.g., a stand-alone safety lighting device). The safety lighting system 10 illustrated in FIGS. 1 and 2 includes one or more lighting features 12 that are coupled to one or more portions of the interior or exterior of an automotive vehicle 8 and that activate in response to an impact event. The safety lighting system 10 also includes one or more power sources 14 that are operably coupled to provide power to the one or more lighting features 12. The safety lighting system 10 is described herein as being independent of a primary electrical power system 6 and a primary electrical power source 4 (e.g., an automotive battery) of the automotive vehicle 8, which provides electrical power to components (e.g. headlamps 13) of the vehicle 8. The term "independent" is intended to convey that these one or more power sources 14 are distinct from the primary electrical power source 4 of the automotive vehicle are capable of functioning in the event that the primary electrical power system 6 of the vehicle fails (e.g., as a result of collision damage). However, it may be appreciated that, in certain embodiments, the power sources 14 may include sources (e.g., one or more battery cells or capacitors) that are electrically coupled and charged by the primary electrical power source 4 of the automotive vehicle 8 and that are able to function independent of the primary electrical power source 4 to power the one or more lighting features 12 in response to an impact event.

In certain embodiments, the safety lighting system 10 may not be coupled to or charged by the electrical system of the automotive vehicle 8. As such, in certain embodiments, the safety lighting system 10 may include one or more power producing or harvesting devices 15 that are operably coupled to provide power to charge the one or more power sources 14 to ensure that the power sources 14 are able to power one or more lighting features 12 of the safety lighting system 10 in response to an impact event. For example, in certain embodiments, as illustrated in FIG. 2, the safety lighting system 10 may include a power harvesting device 15 in the form of a photovoltaic panel (e.g., solar panel) that converts impinging light into electrical current. In certain embodiments, the safety lighting system 10 may include an energy harvesting device 15 in the form of a kinetic energy harvesting device that converts energy associated with the motion of the vehicle into electrical current. In certain embodiments, the safety lighting system 10 may include a radio-frequency (RF) energy harvesting device 15 that receives and converts surrounding RF electromagnetic radiation (e.g., from broadcast radio signals, cellular signals, WiFi signals, Bluetooth® signals, environmental noise) into electrical current. Such power harvesting devices 15 that may be used to compensate for electrical losses of the power sources 14 as a result of operation of the safety lighting system 10 and/or self-discharge of the power sources 14. In certain embodiments, in addition to the one or more lighting features 12, the one or more power sources 14 provide power to operate other components (e.g., control and processing circuitry) of the safety lighting system 10 discussed in greater detail below.

As illustrated, in certain embodiments, the safety lighting system 10 may include multiple lighting features 12 coupled to a single power source 14, which may reduce the cost of the safety lighting system 10. In other embodiments, some or all of the lighting features 12 may be operably coupled to a distinct, respective power source 14, which may enhance the robustness of the safety lighting system 10 to failures of individual power sources 14 (e.g., due to collision damage, age). Further, in certain embodiments, the use of distinct power sources 14 for different lighting features 12 enables the assembly and installation of a safety lighting system 10 that includes or consists of a number of independent (e.g., stand-alone), safety lighting devices, such as the safety lighting devices 16 illustrated in FIG. 2. As illustrated in FIG. 2, in certain embodiments, these safety lighting devices 16 may be disposed at any useful location on the surface of the exterior or interior of the automotive vehicle, including on surfaces that move (e.g., slide, rotate, pivot) relative to other portions of the automotive vehicle 8 (e.g., wheels, tires, windows, sunroof, mirrors) which might be difficult or impossible to wire to a centralized power source 14. Moreover, as discussed in greater detail below, the safety lighting devices 16 may, in certain embodiments, be capable of being activated independently of the other safety lighting devices 16 of the system 10, to indicate that a particular portion of the automotive vehicle 8 (e.g., a wheel, a fender, a bumper) has experienced an isolated impact event (e.g., a pothole impact, a curb impact, an automotive impact) that may have caused isolated damage to the particular portion of the automotive vehicle 8.

In particular, the embodiment of the safety lighting system 10 illustrated in FIG. 2 includes safety lighting devices 16 that are embedded (e.g., encased, implanted) within one or more at least partially transparent surfaces (e.g., side windows 17) of the automotive vehicle 8. In other embodiments, these safety lighting devices 16 may be embedded in any suitable glass (e.g., in the windshield, rear glass, mirrors) or polymer (e.g., headlight covers, taillight covers, hazard light covers) components of the automotive vehicle 8. The illustrated embedded safety lighting devices 16 include one or more lighting features 12 (e.g., an LED) and one or more power sources 14 (e.g., an impact activated battery, as discussed below) embedded within the automotive component, while the devices 16 may be electrically coupled to a central power source 14 of the safety lighting system 10 in other embodiments. By specific example, in certain embodiments, embedded safety lighting devices 16 may include at least partially transparent LED display (e.g., Polytron® transparent displays, available from http://polytronglass.com) that can be used by the safety lighting system 10 to display warning symbols and messages and information related to an impact event, as discussed below for other embodiments.

Furthermore, the illustrated embodiment of the safety lighting system 10 includes suitable processing circuitry (e.g., processor 18) operably coupled to suitable memory circuitry (e.g., memory 20) and suitably sensing circuitry (e.g., sensors 22) that cooperate to determine that a least a portion of the automotive vehicle 8 has experienced an impact event and, in response, to activate some or all of the lighting features 12 of the safety lighting system 10. Additionally, in certain embodiments, the processor 18 may monitor a state of charge of the one or more power sources 14 and may selectively initiate and terminate charging of particular power sources 14 using electrical power from the electrical system 6 of the vehicle 8 or from one or more power harvesting devices 15 of the safety lighting system 10 to ensure that the power sources 14 maintain a predetermined state of charge. Furthermore, as discussed in greater detail below, the illustrated embodiment of the safety lighting system 10 includes wireless communication circuitry 24 that is operably coupled to the processor 18 and that is capable of receiving and/or sending wireless communication signals (e.g., WiFi signals, Bluetooth® signals, cellular signals, global positioning system (GPS) signals) to enable the processor 18 to receive and/or send messages to other electronic devices, such as cellular phones 23, wearable devices 25 (e.g., smart watches, smart glasses), or any other suitable portable electronic devices, in and around the automotive vehicle 8.

Packaging and Mounting

The disclosed safety lighting system 10 may be implemented and coupled to the automotive vehicle in a number of ways. For example, as illustrated in FIG. 1, in certain embodiments, the safety lighting system 10 may be arranged such that the illustrated components are contained within a common packaging 26. For example, in certain embodiments, the safety lighting system 10 may be implemented with the illustrated components being disposed in or on the packaging 26 (e.g., a polymeric housing), and the packaging 26 may be positioned in the interior of the vehicle 8 to provide the disclosed functionality. In other embodiments, as illustrated in FIG. 2, only certain portions of the safety lighting system 10 (e.g., a power source 14, processor 18, memory 20, sensors 22, and/or wireless communication circuitry 24) may be disposed within the packaging 26, while other portions of the safety lighting system 10 (e.g., lighting features 12, power harvesting device 15, and/or stand-alone safety lighting devices 16) instead may be suitably disposed in (e.g., coupled to) various locations about the automotive vehicle 8 and operably coupled to the components within the packaging 26 to provide the disclosed functionality.

Figure 3:
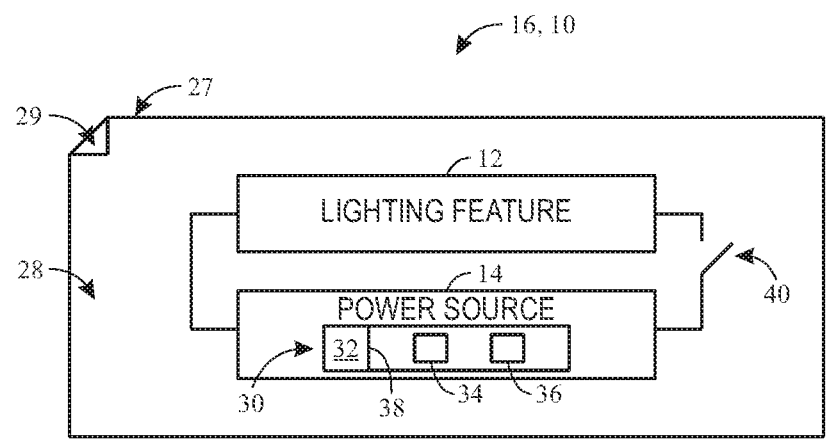
FIG. 3 is a schematic diagram of a safety lighting device, in accordance with embodiments of the present technique.

In certain embodiments, certain components of the safety lighting system 10, such as one or more lighting features 12 and/or one or more stand-alone safety lighting device 16, may include at least one mounting feature to facilitate installation of the safety lighting system 10. A "mounting feature," as used herein, refers to a feature that couples the lighting features 12 and/or stand-alone safety lighting devices 16 to the interior and/or exterior of the automotive vehicle, such as an adhesive layer or openings for receiving an attachment feature (e.g., a screw, a bolt, a rivet, a pin, or a tab). For example, as illustrated in FIG. 3, in certain simplified embodiments, the safety lighting system 10 may include or consists of one or more safety lighting devices 16, each safety lighting device 16 including or consisting of an individual packaging 27. Further, in certain such embodiments, the individual packaging 27 of the safety lighting devices 16 may include an at least partially transparent polymeric layer 28 that is disposed over the lighting feature 12 and the power source 14 to protect these components from the external environment (e.g., precipitation, dust, insects). Additionally, the individual packaging 27 of the safety lighting device 16 illustrated in FIG. 3 includes an adhesive layer 29 (e.g., an epoxy or siloxane based adhesive) that is used to attach (e.g., affix, couple, adhere) the illustrated safety lighting device 16 to any suitable portion of the interior or exterior of the automotive vehicle 8. In certain embodiments, the individual packaging 27 of the safety lighting device 16 may include other layers, such as a reflective layer (e.g., a metallic foil layer) disposed below and around the lighting feature 12 or safety lighting device 16 to enhance the reflection (e.g., scattering, disbursement, distribution) of light emitted by the lighting feature 12 of the safety lighting device 16.

In certain embodiments, the mounting features of the lighting features 12 and/or the safety lighting devices 16 of the safety lighting system 10 may include one or more openings (e.g., receptacles, slots) for receiving an attachment feature (e.g., a screw, a bolt, a rivet, a pin, or a tab). For example, in certain embodiments, the lighting features 12 and/or the safety lighting devices 16 may include a rigid packaging that includes an opening that enables the component to be screwed or bolted to the exterior or the interior of the vehicle 8. For embodiments in which the mounting feature is an adhesive layer, the lighting features 12 and/or the safety lighting devices 16 of the safety lighting system 10 may not be reused upon being removed from the vehicle 8 (e.g., for repair or inspection). Rather, for such embodiments, the lighting feature 12 and/or the safety lighting device 16 may be removed and replaced with a new lighting feature 12. It may be appreciated that this is attachment method is apt for embodiments in which safety lighting devices 16 are irreversibly activated in response to the impact event, and therefore, should be removed and replaced after the impact event.

For example, in certain embodiments, the safety lighting system 10 may include or consist of one or more safety lighting devices 16 that appear as rigid, plastic reflectors that are mounted (e.g., screwed, bolted, adhered) to an exterior surface of the automotive vehicle 8. For such embodiments, at least a portion of the rigid, plastic packaging of the one or more safety lighting devices 16 is transparent, and a reflective layer may be included below the one or more lighting features 12. For such embodiments, when not activated, the safety lighting devices 16 may improve the visibility of the vehicle 8 as simple reflectors, similar to the passive yellow and red reflectors typically used as safety features for bicycles. However, upon being activated in response to an impact event, such safety lighting devices 16 can, in addition to reflecting light from other sources, emit light from the lighting features 12 to further enhance the visibility of the vehicle 8, and reduce the likelihood of subsequent accidents.

In certain embodiments, as illustrated in FIG. 2, the lighting features 12 of the safety lighting system 10 may include electroluminescent paint 50. In general, electroluminescent paint 50 includes one or more layers (e.g., thin films) of material that emit light in response to an applied electrical current or electrical field, and may include additional reflective or protective layers. Electroluminescent paint 50 may include organic and/or inorganic electroluminescent materials, and may have a variable intensity output based on the applied electrical current or field. For such embodiments, the electroluminescent paint 50 may be deposited (e.g., rolled, air-brushed) in a layer-by-layer fashion onto the exterior surface of the vehicle 8. In certain embodiments, the electroluminescent paint 50 may be disposed below a protective top coat disposed over an exterior surface of the vehicle 8.

Activation

The one or more power sources 14 of the safety lighting system 10 are generally designed to activate or to be activated to generate power to operate the lighting features 12 in response to an impact event. For example, FIG. 3 is a schematic illustration of an embodiment of a stand-alone safety lighting device 16 of a safety lighting system 10. For the embodiment illustrated in FIG. 3, the safety lighting device 16 consists of a single lighting feature (e.g., a LED) electrically coupled to a power source 14. Further, the power source 14 of the safety lighting device 16 illustrated in FIG. 3 includes a battery cell 30 in which an electrolyte 32 is separated (e.g., isolated, sequestered) from the cathode 34 and the anode 36 of the cell 30 by a barrier or membrane 38. This barrier 38 is designed to be physically altered by (e.g., rupture in response to) the rapid acceleration associated with the impact event to allow the electrolyte 32 to interact with the cathode 34 and anode 36 of the cell 30, which activates the power source 14 to produce power, thereby activating the lighting feature 12. In other embodiments, a similar membrane may instead separate a portion of the battery cell 30 from the surrounding atmosphere, and when the membrane is ruptured during an impact event, moisture and/or air (e.g., oxygen) from the atmosphere may reach this portion of the battery cell 30 and activate the power source 14. As such, in certain embodiments, the activation of the one or more power sources 14 alone may trigger the activation of the one or more lighting features 12, enabling the manufacture of the simplified embodiment of the safety lighting device 16 illustrated in FIG. 3, which includes a limited number of components to reduce manufacturing cost and complexity. In other embodiments, the safety lighting device 16 may, additionally or alternatively, include an impact-activated switch 40 that begins in an open position, as illustrated, and that closes in response to the impact event to electrically couple the power source 14 to the lighting feature 12, thereby activating the lighting feature 12.

As mentioned above with respect to FIGS. 1 and 2, in certain embodiments, the safety lighting system 10 may include a processor 18, memory 20, and sensors 22 that cooperate to determine whether the automotive vehicle 8 has experienced an impact event and, in response, to activate the safety lighting system 10. For example, in certain embodiments, the processor 18 of the safety lighting system 10 may execute instructions stored in the memory 20 to receive sensing data from one or more sensors 22 (e.g., accelerometers, force sensors) operably coupled to the processor 18, and may detect an impact event based on the received data. For example, in certain embodiments, the processor 18 may determine that an impact event has occurred based on the detection of a rapid acceleration event in the sensing data, in which an acceleration or a force measurement exceeds a predetermined threshold value (e.g., greater than 3 g, greater than 5 g, greater than 10 g) within a predetermined time window (e.g., microseconds or milliseconds). In response, the processor 18 may activate all lighting features 12 of the safety lighting system 10, or selectively activate particular lighting features 12 in response to detecting a localized impact event based on sensing data received from sensors disposed in multiple locations about the automotive vehicle 8, in certain embodiments.

For example, in certain embodiments, the processor 18 may selectively activate a particular lighting feature 12 disposed on an exterior surface of the automotive vehicle 12 (e.g., a bumper, a fender, a wheel) to indicate to the driver, to other motorists, and to first responders that this particular portion of the vehicle 8 has experienced a sufficiently rapid acceleration to be classified as an impact event. Similarly, for embodiments in which safety lighting devices 16 include impact-activated power sources 14, as illustrated in FIG. 3, the safety lighting devices 16 may individually (e.g., independently, separately) activate when their respective impact-activated power sources 14 experience sufficiently rapid acceleration during an impact event to be activated (e.g., via the rupturing of a barrier, via the closing of a switch) and power the lighting feature 12. As such, in certain embodiments, upon activation, the one or more lighting features 12 of the safety lighting system 10 may provide indications of particular regions (e.g., driver-side, passenger-side, front, rear, etc.) or particular components (e.g., bumper, fenders, wheels, shocks, springs, etc.) that should be emphasized as being potentially in a state or damage or disrepair. For example, in certain embodiments, the safety lighting device 16 of the safety lighting system 10 illustrated in FIG. 2, which is disposed on a wheel of the automotive vehicle 8 may activate individually (e.g., independently, separately) from other lighting features 12 of the safety lighting system 10 after the wheel experiences a localized impact event as a result of a road hazard (e.g., a pothole, road debris). Further, in certain embodiments, upon activation, the safety lighting device 16 of the safety lighting system 10 may remain activated until the wheel and surrounding components have been inspected for potential damage and the safety lighting device 16 replaced.

Accordingly, it may be appreciated that the safety lighting system 10 may, in certain embodiments, provide indications to remind the driver or owner that the vehicle 8 should be inspected to ascertain any damage from the impact event. In certain embodiments, the safety lighting system 10 can be used to inform nearby motorists regarding components of the vehicle 8 that are potentially in a state of disrepair and that pose a potential risk. In certain embodiments, the safety lighting system 10 can inform law enforcement officers that the vehicle 8, or a particular portion thereof, is potentially in a state of disrepair that renders the vehicle 8 unlawful to operate on a public roadway. Additionally, selective activation of particular lighting features 12 of the safety lighting system 10 may, in certain embodiments, be used to guide first responders to portions of the vehicle 8 that may be more damaged (e.g., a point of impact), or to portions of the vehicle 8 that include passengers, to enable informed decisions with respect to an emergency response. In certain embodiments, selective activation of particular lighting features 12 of the safety lighting system 10 may, for example, enhance the ability of the occupants to see within the vehicle 8, to advise the occupants of the location of particular emergency or safety features of the vehicle (e.g., emergency release levers, seal-belt removal tools, window breaking tools), and/or to provide indications to passengers regarding which areas of the vehicle 8 may have been more heavily damaged during an impact event and may be more difficult to maneuver to escape the interior of the vehicle 8 after a collision.

Visual Signals

As discussed above, in certain embodiments, the safety lighting system 10 activates in response to an impact event to convey information regarding the impact event. In certain embodiments, the safety lighting system 10 may be activated in particular manners to provide information regarding the impact event to the driver, to other nearby motorists, and/or to emergency responders. For example, in certain embodiments, the one or more lighting features 12 of the safety lighting system 10 may include lighting features 12 (e.g., LEDs) that are capable of outputting light of different (e.g., green, blue, red, orange, yellow) colors/frequencies or intensities. For example, in one embodiment, the processor 18 may activate one or more green LEDs in response to an impact event above a lowest threshold (e.g., 3 g), activate one or more blue LEDs in response to detecting an impact event above a greater threshold (e.g., 5 g), and activate one or more red/orange LEDs in response to an impact event above a highest threshold (e.g., 10 g). In other embodiments, similar color coding information could be imparted using different regions of electroluminescent paint 50 that emit light of different colors/frequencies in response to an applied electrical current or field. As such, in certain embodiments, the safety lighting system 10 may enable the use of color coded light signal to quickly indicate the severity of an impact event to nearby parties.

Figure 4:
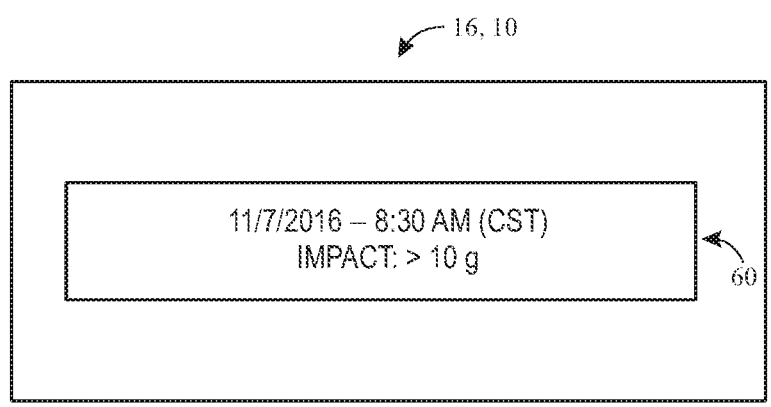
FIG. 4 is a perspective view of a safety lighting device that includes a display capable of presenting information regarding an impact event.

In certain embodiments, one or more lighting features 12 of the safety lighting system 10 may be arranged in a manner to output a visual pattern. For example, as illustrated in FIG. 4, in certain embodiments, a suitable number of LEDs lighting features 12 may be arranged into an array (e.g., LED display 60) that is capable of outputting a visual pattern to nearby motorists and/or emergency responders. In certain embodiments, these visual patterns may include textual information (e.g., warning messages, emergency responder contact information) or hazard indications (e.g., "X" symbols, arrow symbols, emergency symbols, strobing or flashing effects). For the illustrated embodiment, the LED display 60 is capable of outputting textual information related to the impact event (e.g., the time of the impact event, the magnitude or severity of the impact event, the location of the impact event, a number of occupants in the vehicle at the time of the impact event, a presence of infant or child passengers in the vehicle at the time of the impact event, information regarding a registered owner of the vehicle, global positioning system (GPS) coordinates of the impact event, or an amount of time passed since the impact event, or a combination thereof), which may be useful to emergency responders that respond to the impact event. In certain embodiments, the information presented by the one or more lighting features 12 of the safety lighting system 10 may include information stored locally in the memory 20, information received wirelessly from an electronic device of the vehicle (e.g., a programmable logic controller) or of a passenger (e.g., cellular phone 23, wearable 25). Such textual information may also be useful to law enforcement officers by enabling the officers to quickly correlate information pertaining to an impact event experienced by a vehicle and an unsolved automotive infraction (e.g., a hit-and-run) and/or to quickly determine how long a driver may have been operating a vehicle in a state of disrepair after an impact event.

Wireless Communication

As set forth above, in certain embodiments, the safety lighting system 10 may include wireless communication circuitry 24. For such embodiments, the wireless communication circuitry 24 may be used, for example, to communicate with stand-alone safety lighting devices 16 that also include wireless communication circuitry 24, as illustrated in FIG. 1, to instruct the safety lighting devices 16 to activate, deactivate, adjust color, adjust brightness, and so forth. For such embodiments, the wireless communication circuitry 24 may also be used, for example, to enable the safety lighting system 10 to communicate with other electronic devices (e.g., cellular phone 23, wearable 25) of passengers and others nearby. For example, in certain embodiments, in addition to the processor 18 activating the lighting features 12 of the safety lighting system 10 in response to detecting an impact event, the processor 18 may additionally activate the lighting features 12 of the safety lighting system 10 in response to a wireless communication signal from another electronic device of the vehicle 8 or a passenger thereof (e.g., cellular phone 23, wearable 25). By specific example, in certain embodiments, the safety lighting system 10 may enable a person (e.g., a passenger, a first responder, a law enforcement officer) with a suitable electronic device in wireless communication with the safety lighting system 10 to instruct the processor 18 to activate the lighting features 12 despite an impact event not having been detected. For such embodiments, this feature enables the inspection and testing of the lighting features 12 prior to the occurrence of an impact event, and furthermore, enables the safety lighting system 10 to be activated to provide additional information to the public and to first responders in other emergency situations (e.g., abductions, automotive theft, police evasion) beyond impact events.

Additionally, in certain embodiments, the wireless communication circuitry 24 may enable the safety lighting system 10 to emit a wireless signal (e.g., an emergency beacon) in response to an impact event. That is, in addition to the enhanced visual information enabled by the safety lighting system 10, in certain embodiments, the safety lighting system 10 may also provide wireless communication signals to other electronic devices (e.g., cellular phone 23, wearable 25) to indicate information regarding the impact event. For example, in certain embodiments, once the processor 18 has activated the lighting features 12 in response to an impact event, the processor 18 may further instruct the wireless communication circuitry 24 to emit (e.g., regularly, continually, intermittently) a wireless beacon signal (e.g., a cellular, WiFi, Bluetooth, or other suitable signal) that can be received and interpreted by another electronic device (e.g., a cellular phone of a passing motorist, a communication unit of a patrol vehicle of a law enforcement officer, an in-vehicle security and navigation system of a passing motorist). In certain embodiments, the information regarding the impact event conveyed in the wireless beacon may include, for example, the time of the impact event, the magnitude or severity of the impact event, the location of the impact event, a number of occupants in the vehicle at the time of the impact event, a presence of infant or child passengers in the vehicle at the time of the impact event, information regarding a registered owner of the vehicle, global positioning system (GPS) coordinates of the impact event, or an amount of time passed since the impact event, or a combination thereof.

Additionally, in certain embodiments, the wireless communication circuitry 24 may also function to reduce power consumption of the safety lighting system 10 after activation in order to extend an amount of time that the lighting features 12 can be illuminated after the impact event. For example, in certain embodiments, after being activated in response to an impact event, the processor 18 may use the wireless communication circuitry 24 to determine when someone (e.g., a motorist or pedestrian) is approaching the vehicle 8, and only selectively activate the lighting features 12, or adjust the brightness of the one or more lighting features 12, by detecting a wireless communication signal of an electronic device (e.g., cellular phone 23, wearable 25) of the approaching person. That is, rather than wasting power illuminating the lighting features 12 of the safety lighting system 10 continuously after impact-induced activation, the processor 18 may ration charge in the power sources 14 by only illuminating, or only increasing the brightness, of the lighting features 12 in response to detecting an approaching wireless communication signal (e.g., based on an increasing signal intensity). It may be appreciated that such embodiment may also include a RF energy harvesting device 15, such that the power sources 14 of the safety lighting system 10 are also charged by the approaching wireless communication signal.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A safety lighting system of an automotive vehicle, wherein the safety lighting system comprises:

a power source that is independent of an electrical system of the automotive vehicle; and a lighting feature positioned at an exterior surface of the automotive vehicle and electrically coupled to the power source, wherein the power source and the lighting feature are embedded within the exterior surface of a glass or polymer component of the automotive vehicle or disposed within an at least partially transparent polymer packaging that is adhered to the exterior surface of the automotive vehicle, and wherein the safety lighting system is configured to activate the lighting feature to emit light from the exterior surface of the automotive vehicle in response to an impact event.

2. The safety lighting system of claim 1, wherein the lighting feature comprises electroluminescent paint disposed on the exterior surface of the automotive vehicle.

3. The safety lighting system of claim 1, wherein the lighting feature comprises an array of light emitting diodes (LEDs) configured to output a visual pattern when activated in response to the impact event, wherein the visual pattern includes warning messages or hazard symbols that enhance a visibility of the automotive vehicle to drivers of other automotive vehicles.

4. The safety lighting system of claim 3, wherein the visual pattern includes information relating to the impact event, comprising: a time of the impact event, a severity of the impact event, a number of occupants in the automotive vehicle at the time of the impact event, a presence of infant or child passengers in the automotive vehicle at the time of the impact event, or a combination thereof.

5. The safety lighting system of claim 3, wherein the visual pattern includes information relating to the impact event, comprising: information regarding a registered owner of the vehicle, global positioning system (GPS) coordinates of the impact event, or an amount of time passed since the impact event, or a combination thereof.

6. The safety lighting system of claim 1, wherein the power source is not initially activated to supply power and is configured to be activated by a physical change induced by the impact event to activate the lighting feature.

7. The safety lighting system of claim 1, comprising a second lighting feature disposed on a different portion of the exterior surface of the automotive vehicle and electrically coupled to the power source, and wherein the safety lighting system is configured to activate the second lighting feature to emit light from the different portion of the exterior surface of the automotive vehicle in response to the impact event.

8. A method, comprising:

modifying a safety lighting device in response to an impact event to activate a lighting feature of the safety lighting device to emit light from the exterior surface of the automotive vehicle, wherein the safety lighting device is disposed at an exterior surface of an automotive vehicle, and wherein the lighting feature is powered by a power source of the safety lighting device that is independent of an electrical system of the automotive vehicle;

temporarily deactivating the lighting feature to conserve power of the power supply; and reactivating the lighting feature in response to detecting wireless communication signals.

9. The method of claim 8, wherein the safety lighting device is embedded within the exterior surface of a glass windshield, a rear glass, or a glass mirror of the automotive vehicle.

10. The method of claim 8, wherein the safety lighting device is embedded within the exterior surface of a polymer headlight cover, a polymer taillight cover, or a polymer hazard light cover of the automotive vehicle.

11. The method of claim 8, wherein modifying the safety lighting device comprises:

closing an electrical switch that electrically couples the power source to the lighting feature, wherein the electrical switch is initially open before the impact event and is configured to close in response to a rapid acceleration during the impact event to activate the lighting feature.

12. The method of claim 8, wherein modifying the safety lighting device comprises:

rupturing a membrane of the power source in response to the impact event to activate the power source to supply power to activate the lighting feature of the safety lighting device.

13. The method of claim 8, wherein the wireless communication signals comprise wireless communication signals from the automotive vehicle, from an electronic device of a passenger of the automotive vehicle, or a combination thereof.

14. The method of claim 8, wherein the wireless communication signals comprise wireless communication signals from other automotive vehicles, from an electronic device of a passenger of the other automotive vehicles, from an electronic device of an emergency responder, or a combination thereof.

15. The method of claim 8, comprising:

determining, via processing circuitry of the safety lighting device, that the impact event has occurred based on measurements of an accelerometer communicatively coupled to the processing circuitry.

16. The method of claim 8, wherein the power source of the safety lighting device comprises a radio-frequency (RF) energy harvesting device, and wherein the method comprises: harvesting RF energy from wireless communication signals to charge the power source of the safety lighting device.

17. The method of claim 8, wherein the safety lighting device comprises wireless communication circuitry, and wherein activating the lighting feature comprises:

determining a proximity of an electronic device based on wireless communication signals detected by the wireless communication circuitry; and adjusting a brightness of the lighting feature based on the proximity of the electronic device.

18. A safety lighting device for an automotive vehicle, wherein the safety lighting device comprises:

a polymer packaging comprising an adhesive layer;

a power source disposed within the polymer packaging that is independent of an electrical system of the automotive vehicle; and a lighting feature disposed within the polymer packaging and electrically coupled to the power source, wherein the adhesive layer of the polymer packaging is configured to adhere the safety lighting device to an exterior surface of the automotive vehicle, wherein the safety lighting device is configured to activate the lighting feature in response to an impact event of the automotive vehicle to produce light at the exterior surface of the automotive vehicle.

\* \* \* \* \*